United States Patent
Zhou et al.

(10) Patent No.: US 6,720,292 B1
(45) Date of Patent: *Apr. 13, 2004

(54) CONTROLLING FLUID FLOW IN A SUBTERRANEAN FORMATION WITH A REINFORCED CLAY GEL

(75) Inventors: Zhihong Zhou, Edmonton (CA); Bernard Tremblay, Edmonton (CA); Brian Wayne Wiwchar, Sherwood Park (CA)

(73) Assignee: Alberta Oil Sands & Research Authority, Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/592,159

(22) Filed: Jun. 12, 2000

Related U.S. Application Data (63) Continuation-in-part of application No. 08/760,573, filed on Dec. 4, 1996, now Pat. No. 6,143,699.

(51) Int. Cl.[7] .................... C09K 3/00; E21B 21/00
(52) U.S. Cl. ............... 507/276; 507/200; 507/269; 507/277
(58) Field of Search ............... 507/276, 200, 507/269, 277

(56) References Cited

U.S. PATENT DOCUMENTS

| | | | |
|---|---|---|---|
| 3,149,669 A | 9/1964 | Binder, Jr. et al. | 166/9 |
| 3,208,515 A | 9/1965 | Meadors | 166/9 |
| 4,366,074 A | 12/1982 | McLaughlin et al. | 252/8.55 R |
| 4,561,985 A | 12/1985 | Glass, Jr. | 252/8.5 A |
| 4,625,802 A | 12/1986 | Sydansk | 166/292 |
| 4,631,091 A | 12/1986 | Goodman | 106/308 N |
| 4,799,551 A | 1/1989 | Bauer et al. | 166/303 |
| 5,099,923 A | 3/1992 | Aften et al. | 166/294 |
| 5,152,906 A | 10/1992 | Aften et al. | 252/8.551 |
| 5,203,411 A | 4/1993 | Dawe et al. | 166/274 |
| 5,576,271 A | 11/1996 | Patel | 507/110 |
| 5,597,784 A | * 1/1997 | Sinclair et al. | 166/280 |
| 5,855,243 A | 1/1999 | Bragg | 166/275 |
| 6,143,699 A | * 11/2000 | Zhou | 507/200 |

FOREIGN PATENT DOCUMENTS

| | | | | |
|---|---|---|---|---|
| CA | 733033 | * | 4/1996 | 166/16 |

OTHER PUBLICATIONS

H. Frampton, "Chemical Gel Systems for Improved Oil Recovery" (Allied Colloids Limited, Yorkshire, UK BD120JZ), Spec. Publ. –R. Soc. Chem., *Recent Advances in Oilfield Chemistry* 159:295–310;1994.

* cited by examiner

*Primary Examiner*—Jill Warden
*Assistant Examiner*—Monique T. Cole
(74) *Attorney, Agent, or Firm*—Kurt D. Van Tassel; Deborah G. VandenHoff; Van Tassel & Associates (57) ABSTRACT

A method is provided for blocking high permeability regions in subterranean geological formations, using a reinforced swelling clay gel. A reinforced clay slurry is prepared by mixing swelling clay, such as bentonite, an aqueous solution containing the salt of certain cations, which inhibit clay swelling, and a reinforcing agent. The cations $K^+$, $Ca^{2+}$, $Mg^{2+}$, $Cs^{2+}$, $Fe^{2+}$, $Al^{3+}$ and $NR_4^+$, where each R can independently be H, $CH_3$, $C_6H_5$, or $CH_2CH_3$, and combinations thereof, among others, are clay swelling inhibitors. The reinforcing agent is non-swelling particles, including, without limitation, particles of produced sand, silica sand, sandy or silty soil, crushed rock, minerals, mine tailings, and combinations thereof. The reinforced clay slurry is introduced into a geological formation, where it preferentially enters high permeability regions. There the slurry is contacted by NaCl brine solution present in natural or injected drive fluids, and the inhibitive cations bound to the clay particles are replaced by $Na^+$ ions, which attract water molecules and promote clay swelling. The reinforced $Na^+$-clay swells, causing the slurry to acquire a gel-like consistency. The reinforced clay gel so formed is capable of controlling the flow of at least a majority of a fluid into or from a high permeability region.

28 Claims, 3 Drawing Sheets

CONTROLLING FLUID FLOW IN A SUBTERRANEAN FORMATION WITH A REINFORCED CLAY GEL

CROSS-REFERENCE TO RELATED PATENT APPLICATIONS

This application is a continuation-in-part of application Ser. No. 08/760,573 filed Dec. 4, 1996 now U.S. Pat. No. 6,143,699.

FIELD OF THE INVENTION

The invention relates to a method for controlling the flow of a fluid through high permeability strata, fractures and high permeability channels (wormholes), in a subterranean formation. An example is controlling the influx of water during the recovery of hydrocarbons from geological formations. In particular, the invention relates to chemical gel systems containing a reinforcing agent, (e.g., produced sands) for permeability modification of such formations.

BACKGROUND OF THE INVENTION

During the recovery of hydrocarbons from subterranean formations, significant amounts of hydrocarbons are left behind because injected or natural drive fluids in the formation are produced along with the oil to such an extent that the cost of fluid disposal makes further oil recovery uneconomical. In formations with high permeability strata, fractures, or high permeability channels (wormholes), natural drive fluids (such as brine or gaseous hydrocarbons) in primary recovery processes or flooding fluids (such as brine, steam or carbon dioxide) in secondary recovery processes flow through highly permeable zones, resulting in progressively less hydrocarbon being recovered per unit volume of fluid produced. This increased ratio of drive or flooding fluid to hydrocarbons is usually due either to early breakthrough of flooding fluid from injector wells to producer wells, or to excessive water encroachment into producer wells. It has adversely affected the economics of recovery processes in many parts of the world. For example, it was recently estimated that in the United States, 7 barrels of water are produced for each barrel of oil, amounting to $2.1 \times 10^{10}$ barrels of water annually. In Alberta, Canada, the ratio of water/oil produced is 6/1, amounting to $3.0 \times 10^9$ barrels of water produced in 1997.

The control of fluid flow in subterranean formations is commonly referred to as "conformance control". For the past two decades, research has been directed at improving the oil/water ratio during hydrocarbon production by using chemical gel systems to block water flow through high permeability zones, fractures and high permeability channels (referred to herein as "high permeability regions"). The general approach has been to inject a mixture of reagents, initially low in viscosity, into regions of a formation which have high permeability. Once the mixture of reagents has reached its destination in the desired region of the formation, it then undergoes a chemical reaction to produce a gel which is capable of blocking the flow of water. Polymers, chemical gels, silica gels, and other blocking agents have been used in this way for conformance control in geological formations.

Ideally, a gel system for conformance control should have the following properties:

1. The reagents should be easily delivered to the desired location in the formation. The components therefore should be initially of low viscosity. No component should be adsorbed out prior to reaching its destination, and each component should be stable to shear stress encountered during delivery.
2. The chemical reaction(s) required for gelation under the conditions found in the formation.
3. The gel generated should be of high strength under the conditions found in the formation or its strength reinforced with a readily accessible, low cost reinforcing agent.
4. The degree of permeability reduction should be high.
5. The system should be of low enough cost to make it economically feasible.
6. The system should have minimal environmental impact.

All of the chemical gel systems currently available for conformance control have the drawback of being so costly that their use is limited. Examples of existing gel systems are:

1. Polyacrylamide copolymers which are injected together with a cross-linking agent, and a chromium (III) or aluminum (III) compound;
2. Xanthan gum (a natural heteropolysaccharide) which together with a cross-linking agent, and a chromium (III) compound;
3. Poly (Vinyl alcohol) which is injected together with a cross-linking agent, and gluteraldehyde; and
4. Acidified sodium silicate, which when neutralized, rapidly undergoes polymerization to form spherical silica particles.

The most widely used method of these involves use of polyacrylamide cross-linked with chromium ions. Its use is limited by its cost: 1 m³ polyacrylamide costs about 200 to 500 USD, while typical applications use from about 20 m³ to about 300 m³. It is also relatively unstable under the elevated temperature conditions which exist in deep geological formations or reservoirs undergoing thermal recovery processes. Furthermore, chromium (VI), the oxidation product of chromium (III) is highly toxic, so the use of a chromium (III) compound as a cross-linking agent can be an environmental concern.

Another application for a conformance control gel system is to block permeable regions to contain a fluid within a certain region. This may be particularly applicable to the disposal of fluids in a subterranean formation, i.e. to reduce the flow of a disposal fluid into other regions.

There is therefore a need to develop further conformance control gel systems which are environmentally safe, inexpensive and effective under the conditions encountered during hydrocarbon recovery.

SUMMARY OF THE INVENTION

In accordance with the present invention, a method is provided for method for controlling the flow of at least one fluid in a subterranean formation having at least a first region, said first region having (i) at least Na$^+$, and (ii) a first permeability, $K_1$, with respect to said fluid, said method comprising: (a) making an inhibitive electrolyte solution having water and at least one inhibitive compound, said inhibitive compound having at least one cation and anion; (b) making a clay/reinforcing agent slurry by mixing at least about 15 weight percent of a swelling clay with said inhibitive electrolyte solution so that, to the extent clay gel is produced, if any, the flowability of said slurry is not substantially inhibited and mixing a reinforcing agent in the range of from about 10 weight percent to about 60 weight percent; (c) injecting said clay/reinforcing agent slurry into said formation, so that at least a portion of said slurry contacts said first region; (d) allowing a reinforced clay gel to form in said first region so that $K_1$, is reduced to produce a lower permeability, $K_{1L}$, with respect to said fluid; and (e) controlling the flow of at least a majority of said at least one fluid into or from said first region.

In accordance with the present invention, there is also provided method for controlling the flow of at least one fluid in a subterranean formation having at least a first region, said first region having (i) at least $Na^+$, and (ii) a first permeability, $K_1$ with respect to said fluid said method comprising: (a) making a first inhibitive electrolyte solution having water and at least one inhibitive compound, said inhibitive compound having at least one cation and anion; (b) treating a swelling clay with said first inhibitive electrolyte solution; (c) making a clay/reinforcing agent slurry having at least about 15 weight percent of the treated clay of step (b) and a second inhibitive electrolyte solution having water and at least one inhibitive compound and mixing a reinforcing agent in the range of from about 10 weight percent to about 60 weight percent; (d) injecting said clay/reinforcing agent slurry into said formation, so that at least a portion of said slurry contacts said first region; (e) allowing a reinforced clay gel to form in said first region so that $K_1$, is reduced to produce a lower permeability, $K_{1L}$, with respect to said fluid; and (f) controlling the flow of at least a majority of said at least one fluid into or from at least said first region.

DESCRIPTION OF THE DRAWINGS

In drawings which illustrate embodiments of the present invention.

DETAILED DESCRIPTION OF THE PREFERRED EMBODIMENT

In accordance with the invention, a method for controlling fluid flow through permeable regions, particularly high permeability regions, in subterranean formations is provided, using swelling clay gels comprising a reinforcing agent (hereinafter referred to as "reinforced clay gel"), wherein such reinforced clay gel can swell in situ to reduce the permeability of a region where the clay gel is introduced. In particular, fluid in a region of a subterranean formation having a first permeability $K_1$ can be blocked with the reinforced clay gel such that the permeability to the fluid is reduced to a lower permeability $K_{1L}$. Thus, the flow of fluid in that region of the subterranean formation can be reduced or blocked.

By "swelling clay" we mean a clay mineral that, when exposed to fresh water or brine, can swell from at least two times to many times the volume of the air-dried clay. The terms clay or clay minerals as used herein refers to minerals having unique physicochemical properties, such as those described below. Generally, clay minerals consist of hydrous layer silicates that comprise a large part of the family of phyllosilicates.

To more fully appreciate the types of clay minerals and their physicochemical attributes, useful for practicing the claimed invention, we will briefly describe some common structural and chemical characteristics of clay minerals. Broadly described, clay minerals consist of positively charged central ions (i.e., cations), such as for example, without limitation, silicon (Si), aluminum (Al), iron (Fe) or magnesium (Mg), bound in a coordination polyhedron that is either a tetrahedral or an octahedral arrangement with negatively charged ions (i.e., anions) of oxygen (O) and hydroxyl (OH) groups. These tetrahedral and octahedral arrangements are networked to form tetrahedral ("T") sheets and octahedral ("O") sheets.

Tetrahedral sheets are networks of tetrahedra typically having Si cation as a central ion, although other cations may be present (e.g., without limitation, $Fe^{3+}$ or $Al^{3+}$), and oxygen atoms forming the four tetrahedral corners. The individual tetrahedra are connected with adjacent tetrahedra by sharing three corners (i.e., three oxygen atoms). The fourth tetrahedral corner points in a direction normal to the T sheet.

Octahedral sheets are networks of octahedra usually, but not always, having a cation substantially at the center of each octahedron, for example, without limitation, $Al^{3+}$, $Mg^{2+}$, $Fe^{2+}$ or $Fe^{3+}$, and oxygen atoms and hydroxyl groups at the eight corners. The individual octahedra are linked laterally with the neighboring octahedra, and vertically with the tetrahedra, by sharing oxygen atoms.

The structure arising from the assembly of tetrahedral and octahedral sheets is called a structural layer. The two primary types of structural layers recognized by those skilled in the art of clay mineralogy are a 1:1 layer or TO layer and 2:1 layer or TOT layer. A 1:1 or TO layer consists of an assembly of one tetrahedral sheet with one octahedral sheet, while a 2:1 or TOT layer consists of an assembly of two tetrahedral sheets with an octahedral sheet sandwiched therebetween. In the case of a TOT layer, the relative disposition of both tetrahedral sheets is inverted so that all apical oxygen atoms point toward the octahedral sheet and can be shared. The type of swelling clay minerals useful in practicing the invention belong to the 2:1 or TOT layer type minerals. For example, the general groups of clay minerals known as smectites or vermiculites belong to the 2:1 or TOT layer type.

The intervening space between two successive layers, whether such layers are TO or TOT layers, is typically referred to as an interlayer. If the TO or TOT layers are electrostatically neutral (i.e., all structural central cations are compensated by $O^{2-}$ or $OH^-$), the interlayer will lack any cations or anions for providing an overall charge balance. However, many clay minerals possess a negative charge imbalance in their layer structure. For example, the TOT layers in smectites typically have a negative charge imbalance of about 0.3 to about 0.6 per $O_{10}(OH)_2$, while the TOT layers in vermiculites typically have a negative charge imbalance of about 0.6 to about 0.9 per $O_{10}(OH)_2$. In the case of both smectites and vermiculites, the TOT layer negative charge imbalance is offset by cations, such as, for example, without limitation $K^+$, $Na^+$, $Mg^{2+}$ and $Ca^{2+}$, found in the interlayer, which are typically, but not always, hydrated.

In turn, the charge imbalance in the layer structure is a good indicator of the cation-exchange capacity of the clay mineral. Generally, as the negative charge imbalance decreases, the interlayer cation's attraction for the mineral's layer structure decreases, and hence the interlayer cation becomes comparatively easier to displace. Accordingly, smectites, which, on average, have a lower negative charge imbalance than vermiculites, have a greater tendency to swell than vermiculites.

In any case, a clay mineral's cation-exchange capacity can be used to control its swelling ability when exposed to water. For example, $Na^+$, which facilitates the adsorption of water in the interlayer, can be used to displace a cation, such as, for example, without limitation, $Ca^{2+}$ or $K^+$, which inhibits the amount of water adsorbed into the interlayer, and hence clay swelling, relative to $Na^+$. This is why certain smectites, such as sodium montmorillonite (also, commonly referred to as sodium bentonite or Western or Wyoming bentonites) have notably higher swelling capacity than calcium montmorillonite (also, commonly referred to as calcium bentonite or Southern or subbentonites). Consequently, it is preferable to use sodium swelling clays (e.g., sodium smectites or sodium vermiculites) in practicing the claimed invention, because of their comparatively greater cation exchange capacity and swelling capacity.

Suitable swelling clays for use in the claimed invention are smectites and vermiculites. Examples of suitable smectites are, without limitation, montmorillonite, beidellite, nontronite, hectorite, saponite, sauconite and laponite.

It should be noted that, in earlier literature discussions of clay minerals and mineralogy, the term montmorillonite was used for both the group name (now referred to as smectite) for the general class of 2:1 or TOT clay minerals that carry a negative layer charge imbalance and characteristically expand when solvated with water and/or alcohols, as well as a particular species of the group. As used herein, however, the term montmorillonite is used to refer to a particular species of the smectite group.

Bentonite is a rock rich in montmorillonite and which may be comprised of other smectites as well as other non-clay mineral constituents. Consequently, montmorillonites or their mixtures with other smectites are often referred to simply as bentonite. Mixed-layer minerals, for example, without limitation, illite-smectite, illite-chlorite-smectite and illite-smectite-ermiculite, may also be suitable clay minerals for use in the claimed invention, provided the such mixed layer minerals have at least 60 weight percent smectite and/or vermiculite on a dry weight basis.

By "reinforcing agent" we mean non-swelling particles. Examples of suitable reinforcing agents include particles of produced sand, silica sand, sandy or silty soil, crushed rock, minerals, mine tailings, and combinations thereof. Examples of suitable minerals include quartz, feldspar, bauxite, and combinations thereof. Preferably, the reinforcing agent has an average largest dimension, e.g. diameter, in the range of from about 20 μm to about 3 mm. As the concentration of reinforcing agent increases, the average fluid layer thickness between reinforcing agent articles decreases. Thus, the shear rate within the fluid layer increases as the reinforcing agent concentration increases because the reinforcing agent particles cannot deform. Accordingly, the viscosity increases and a higher pressure is required to deform a clay gel as the reinforcing agent concentration increases.

In a preferred embodiment, the reinforcing agent is sand produced, for example, in cold production of heavy oil from unconsolidated oil sand. Cold production involves simultaneous production of heavy oil and sand, and, under certain reservoir conditions, production of sand leads to formation of wormholes, ranging from tens to hundreds of meters in length, emanating from the wellbore. Such production of sand causes two major operational costs. First, the large quantity of sand must be disposed of. Second, wormholes often break into water zones resulting in a significant reduction in oil production with a significant increase in water production. Accordingly, a clay gel reinforced with produced sands provides a means for disposal of produced sand. As well, the reinforced clay gel can be used to block the wormholes created by the produced sand. Produced sands can be "cleaned" to extract any residual oil therefrom prior to being added to the clay slurry. Alternatively, the produced sand can be used in a naturally produced state.

As discussed above, the swelling clays, in their natural state, are associated with cations, such as sodium ions, in the interlayers which provide hydration and clay swelling. In the method of the present invention, the swelling clays are treated with an inhibitive cation which displaces the naturally-occurring cations in a cation exchange reaction. Examples of suitable inhibitive cations include $k^+$, $Cs^+$, $Ca^{2+}$, $Mg^{2+}$, $Fe^{2+}$, $Al^{3+}$ and $NR_{4+}$, where each R can independently be H, $CH_3$, $C_6H_5$, or $CH_2CH_3$ and combinations thereof. The most effective inhibitive cation is believed to be $k^+$. The identity of the anion in the inhibitive salt is not known to be of any importance. For example, the $k^+$ cation could probably be provided in the form of KCl, $KNO_3$, $K_2CO_3$, or another salt containing $k^+$ as the cation. A particularly suitable source of $k^+$ ions is KCl.

As used herein, "inhibitive compounds" are compounds having the "inhibitive cations" discussed above.

Swelling clays do not swell significantly when contacted with such inhibitive cations, which bind to the clay particles and reduce the extent to which a clay mineral's interlayer can be hydrated. Therefore, swelling clays can be dispersed in an aqueous solution containing an effective concentration of an inhibitive cation to form a highly concentrated slurry that is somewhat viscous. The slurry can be poured or injected into a subterranean formation.

Sodium cation, $Na^+$, which is present in the brine of many subterranean formations as well as in injection fluids, is not an inhibitive cation. Generally, as discussed above, $Na^+$ tends to maximize the extent to which a clay mineral's intedayer can be hydrated and thereby enhance clay swelling. When swelling clay slurries, which have inhibitive cations in their interlayer are contacted with $Na^+$-rich fluids, a cation exchange reaction occurs, whereby $Na^+$ displaces the inhibitive cation. For example, if the inhibitive cation is $K^+$, the $K^+$ ions are replaced by $N^+$ ions when the slurry is contacted by NaCl brine in the following cation exchange reaction;

$Na^+$+K-Smectite→$K^+$+Na-Smectite.

The $Na^+$ in the interlayer of the clay particles attract water molecules. Moreover, the interaction between the $Na^+$ in the clay mineral's interlayer and its adjacent layers is sufficiently weak to permit the interlayer to expand as more water molecules are attracted to the interlayer. Accordingly, the clay swells, causing the slurry to take on a gel-like consistency.

The tendency to form a gel-like consistency is inhibited using inhibitive cations. It is therefore possible to inject a highly concentrated reinforced clay slurry prepared with inhibitive cations into a subterranean formation having a permeable region, because the clay slurry is not transformed into a gel. The cation exchange reaction which takes place when the slurry is contacted with $Na^+$-rich formation water and/or injection fluids once in the subterranean formation initiates a gelation process. The reinforced clay gel so formed has the ability to block or reduce the permeability of the permeable region and to thereby significantly reduce the early breakthrough of flooding fluid from injector wells or excessive water production through producer wells. The reinforcing agent in the reinforced clay gel provides even greater gel strength and therefore, an increased ability to block or reduce the permeability of the permeable region of a subterranean formation.

The amount of clay in the reinforced clay slurry is preferably in a range from about 15 to about 35 weight percent (dry weight). If the clay content is too low, the swollen reinforced clay slurry will not have the desired gel-like consistency. If the clay content is too high, the reinforced clay slurry will be too viscous to be poured or injected into a formation. More preferably, the clay content should be in the range from about 25 to about 35 weight percent.

The amount of reinforcing agent in the reinforced clay slurry is preferably in a range of from about 10 to about 60 weight percent, more preferably in a range of from about 30 to about 50 weight percent, and most preferably in a range of from about 40 to about 50 weight percent. If the amount of reinforcing agent content is too high, i.e., greater than about 60 wt. %, then the required injection pressure will be too high. If the amount of reinforcing agent content is too low, i.e., less than about 10 wt. %, then the reinforcing agent may settle out within the high permeability region.

The concentration of the inhibitive compound in the slurry preferably should be in the range of from about 0.5 to about 5 weight percent. Preferably, the inhibitive compound concentration should be in the range of from about 1 to about 3 weight percent. If the concentration of the inhibitive cation in the slurry is too low, the clay may swell partially, reducing the amount of clay that can be mixed into a slurry, for injection into the subterranean formation.

To form a reinforced clay slurry, the swelling clay is mixed into an aqueous solution containing an inhibitive compound to form a clay slurry.

In one embodiment, the swelling clay is first pre-saturated with an inhibitive cation before making the slurry. This involves repeated washing of the clay in an inhibitive compound solution such, as a KCl solution. The clay is then dried before use. This step is thought to be effective because saturation of the clay particles with an inhibitive cation displaces a sufficient number of $Na^+$ ions, to provide a slurry which is capable of being injected into a subterranean formation.

Preferably, a dispersion agent is added to the clay slurry to reduce agglomeration of clay particles, thereby promoting a uniform suspension of clay particles in the slurry. Suitable dispersion agents include sodium acid pyrophosphate, sodium pyrophosphate and lignosulfates. The dispersion agent may be added at a concentration ranging from about 0.1 to about 3.0 weight percent.

The clay slurry is then mixed with a reinforcing agent to produce a reinforced clay slurry.

It is anticipated that the viscous reinforced clay slurries, when delivered into a subterranean formation, will preferentially enter channels of relatively high permeability, such as fractures or wormholes, and will not enter and effect blockage in areas of relatively low permeability in the formation. Experimental model results show that injected clay slurry preferentially enters and blocks simulated high permeability sand and does not enter simulated low permeability sand.

The reinforced clay gels of the present invention are useful for controlling the influx of water into the hydrocarbon producing region of the subterranean formation. Also, the reinforced clay gels may be used to contain fluids, for example contaminated fluids, in a certain region of a subterranean formation by blocking permeability channels in the region, thereby controlling the flow of contaminated fluids.

As discussed above, in a preferred embodiment, the reinforcing agent is produced sand. In this way, the reinforced clay slurry provides both a means for disposal of produced sands and a means for controlling the flow of fluids to and from a region of a subterranean formation.

Also, the reinforced clay gel can be used as a means for disposal of contaminated solids. The contaminated solids act as a reinforcing agent in a reinforced clay slurry. The clay particles coat the contaminated solids and when the reinforced clay slurry is injected into a subterranean formation, a reinforced clay gel is formed. The clay gel encapsulates the contaminated solids. Accordingly, fluid in the region of the subterranean formation occupied by the reinforced clay gel substantially reduces that rate at which such contaminants are leached from the region containing such a reinforced clay gel.

The following non-limiting examples of embodiments of the present invention are provided for illustrative purposes only.

EXAMPLE 1

Preparation of Clay Slurry

A 30 wt. % clay slurry was prepared by mixing 30 g of bentonite (NATURAL GEL™ from Canamara United, Edmonton, Alberta, Canada in 70 g of an aqueous solution of 5 wt. % KCl and 0.2 wt. % sodium acid pyrophosphate. Sodium acid pyrophosphate was used as a dispersion agent.

A 35 wt. % clay slurry was prepared in the same manner as above, using 35 g of bentonite in 65 g of solution.

EXAMPLE 2

Preparation of Reinforced Clay Slurry 100 g of the 30 wt. % clay slurry produced in Example 1 was mixed with 100 g produced sand, added stepwise, by shaking in a 1-L NALGENE™ bottle. The produced sand, having a residual oil content of about 2 wt. %, was obtained from Husky Oil. The reinforced clay slurry had a volume of about ½ L.

In most of the samples tested in Examples 3 and 4, the natural produced sand was first "cleaned" by extracting the residual oil with toluene. However, produced sand in its natural state with residual hydrocarbons intact. (hereinafter, "natural" sand) was also tested in Test #3 of Example 4. Following toluene extraction, "cleaned" sand was dried at 110° C. Both the "cleaned" and "natural" sand samples were sieved through an 18 mesh screen to homogenize the sample, break up large lumps and to remove small pebbles and other extraneous material.

The resultant reinforced clay slurry contained 15 wt. % clay, 50 wt. % produced sand, and 2.5 wt. % KCl.

Other reinforced clay slurries were produced using the 35 wt. % day slurry of Example 1 with 67 g, 97 g and 100 g produced sand, resulting in reinforced clay slurries containing, respectively:

21 wt. % clay, 40 wt. % sand, and 3 wt. % KCl
18 wt. % clay, 49 wt. % sand, and 2.5 wt. % KCl
17.5 wt. % clay, 50 wt. % sand, and 2.5 wt. % KCl

EXAMPLE 3

Addition of a reinforcing agent increases the viscosity of a clay slurry up to 20 times. Surprisingly, however, estimated injection pressures calculated below demonstrate that the reinforced clay slurry can be injected into a formation at a reasonable rate.

Viscosity of Reinforced Clay Slurries

The viscosity of reinforced clay slurries produced in Example 2 was measured in order to estimate the pressure required to inject the slurries into a subterranean formation. Because the slurries are shear thinning (i.e., the viscosity decreases with increasing shear rate), the measurements were performed at approximately the same shear rates as would be encountered in the field.

Measurements were made by flowing slurries at different flow rates through capillary tubes and measuring the pressure drop.

The stainless steel capillary tubes used for measurement were (1) 0.775 cm inside diameter×30 cm long and (2) 0.214 cm inside diameter×30 cm long. Another length of tubing (30 cm) having the same diameter as the capillary tube was placed at each end of the capillary tube to minimize turbulence in the capillary tubing used for measurement. This was verified by calibrating the capillary tube with a Newtonian fluid.

Also, the viscosity measurements were not corrected for viscosity differences arising from various shear rates, typically known as slip or slippage. The two different diameter capillary tubes were used to determine the amount of slip at the wall of the capillary tube. Differences in viscosity for a given shear rate indicate slip. Because the viscosity measurements for a given shear rate were within experimental error, it appeared that slippage could be neglected in the viscosity calculations.

The pressure drop was measured with four differential pressure transmitters (Rosemount) with ranges of 4 kPa to 1000 kPa.

Reinforced clay slurries prepared in Example 2 were placed in a stainless steel accumulator. A clay slurry, produced in Example 1, without reinforcing agent, was used for the Control sample.

A Jeffri pump was used to move the slurry from the accumulator to the capillary tube. The slurry was collected in a stainless steel cylinder, maintained at a pressure of 1 MPa (145 psi), to reduce the effect of trapped air on the measurements. Slurry was injected into the capillary tube at flow rates of 5, 20, 80, 320, 500, 1000 and 1982 cm$^3$/hr.

The viscosity, $\eta$, of the slurries was approximated using equation (I), according to Bird et al ("Transport Phenomena" John Wiley & Sons, Toronto; 1960):

$$\eta = \tau_w/\gamma_{corr} \times k(\gamma_{corr})^{n-} \tag{I}$$

where:

$\eta$ = viscosity, $\tau$ = shear stress at wall = $(\Delta P_m/L)R/2$ where $\Delta P_m$ is the measured pressure drop across the capillary tube L = length of capillary tube R = radius of capillary tube $\gamma_{corr}$ = shear rate corrected for shear thinning = $(3n+1)/(4n)(8U_m/D)$ where $U_m$ = average velocity across section of capillary tube = $Q/(\pi R^2)$ where Q = volumetric flow rate k = power law constant; and n = power law index The shear stress at the wall of the tube can be written as:

$$\tau = k'\gamma^n_{app} \tag{II}$$

where $k' = k((3n+1)/(4n))^n$; and $\gamma_{app} = 8 U_m/D$.

The shear stress, $\tau$, and apparent shear rate, $\gamma_{app}$, were calculated according to equations (I) and (II) and plotted on a log-log plot. The data was fitted to a straight line. The slope of the line is the power law index, n, and the y-intercept is equal to log k'. The corrected shear rate was then calculated using equation (III):

$$\gamma_{corr} = (3n+1)/(4n)(8U^m/D) \tag{III}$$

Accordingly, the viscosity was calculated using equation (IV):

$$\eta = \tau/\gamma_{corr} \tag{IV}$$

and the power law constant was calculated from equation (V):

$$k = k'(4n)^n/(3n+1)^n \tag{V}$$

The viscosity measurement was not corrected for yield stress because, at higher shear rates, the slurry yields completely within the capillary tube. It was difficult to accurately measure the yield stress. Accordingly, the influence of yield stress on the viscosity calculation was tested at the highest shear rate. As an upper limit for the yield stress, the wall shear stress at the lowest shear rate was used.

The viscosity, power law constant (k), power law index (n) and corrected shear rate are tabulated in Table 1 for the 0.214 cm diameter capillary tube and in Table 2 for the 0.775 cm diameter capillary tube. For ease of comparison between clay slurries containing no reinforcing agent and reinforced clay slurries, the amount of clay is the amount of clay in the clay slurry prior to addition of reinforcing agent. For example, a 100 g sample containing 35 g clay, added to 100 g sand is reported in Tables 1 and 2 as 35 wt. % clay plus 50 wt. % sand.

TABLE 1

Shear Rate and Viscosity for 0.214 cm diameter capillary tube

| Slurry Type | Flow Rate (cm$^3$/hr) | $\Delta$P (Pa) | Shear Rate (s$^{-1}$) | Viscosity (mPa-s) | k (mPa-s) | n |
|---|---|---|---|---|---|---|
| 30 wt. % clay (no sand) | 5 | 1,800 | 1.88 | 1,710 | 2,600 | 0.46 |
| | 20 | 3,800 | 7.51 | 903 | 2,600 | 0.46 |
| | 80 | 7,500 | 30.0 | 445 | 2,600 | 0.46 |
| | 320 | 14,200 | 120 | 210 | 2,600 | 0.46 |
| | 1,000 | 19,300 | 375 | 91.7 | 2,600 | 0.46 |
| 35 wt. % clay (no sand) | 5 | 8,000 | 2.09 | 6,830 | 10,000 | 0.36 |
| | 20 | 12,300 | 8.35 | 2,625 | 10,000 | 0.36 |
| | 50 | 14,800 | 20.9 | 1,264 | 10,000 | 0.36 |
| | 80 | 18,000 | 33.4 | 961 | 10,000 | 0.36 |
| | 200 | 21,300 | 83.5 | 83.54 | 10,000 | 0.36 |
| | 320 | 48,000 | 134 | 640 | 10,000 | 0.36 |
| | 800 | 36,700 | 334 | 196 | 10,000 | 0.36 |
| | 1,000 | 65,000 | 418 | 278 | 10,000 | 0.36 |
| | 1,982 | 57,000 | 828 | 123 | 10,000 | 0.36 |
| 30 wt. % clay + 40 wt. % sand | 5 | 22,000 | 2.00 | 19,565 | 22,700 | 0.39 |
| | 20 | 25,000 | 8.02 | 5,560 | 22,700 | 0.39 |
| | 80 | 37,000 | 32.1 | 2,055 | 22,700 | 0.39 |
| | 320 | 74,000 | 128.3 | 1,030 | 22,700 | 0.39 |
| | 1,000 | 180,000 | 400 | 800 | 22,700 | 0.39 |
| 30 wt. % clay + 50 wt. % sand | 5 | 58,000 | 1.95 | 53,102 | 51,100 | 0.42 |
| | 20 | 73,000 | 7.79 | 16,710 | 51,100 | 0.42 |
| | 80 | 45,000 | 31.2 | 2,575 | 51,100 | 0.42 |
| | 320 | 200,000 | 124.7 | 2,860 | 51,100 | 0.42 |
| | 1,000 | 600,000 | 389 | 2,750 | 51,100 | 0.42 |

TABLE 1-continued

Shear Rate and Viscosity for 0.214 cm diameter capillary tube

| Slurry Type | Flow Rate (cm³/hr) | ΔP (Pa) | Shear Rate (s⁻¹) | Viscosity (mPa-s) | k (mPa-s) | n |
|---|---|---|---|---|---|---|
| 35 wt. % clay + 40 wt. % sand | 5 | 70,000 | 2.08 | 60,045 | 66,400 | 0.36 |
| | 20 | 72,000 | 8.32 | 15,440 | 66,400 | 0.36 |
| | 80 | 77,000 | 33.26 | 4,130 | 66,400 | 0.36 |
| | 320 | 195,000 | 133 | 2,614 | 66,400 | 0.36 |
| | 1,000 | 498,000 | 416 | 2,136 | 66,400 | 0.36 |
| 35 wt. % clay + 50 wt. % sand | 20 | 112,000 | 6.87 | 29,070 | 52,200 | 0.57 |
| | 80 | 140,000 | 27.5 | 9,085 | 52,200 | 0.57 |
| | 320 | 370,000 | 109.9 | 6,000 | 52,200 | 0.57 |
| | 1,000 | 1,000,000 | 344 | 5,190 | 52,200 | 0.57 |

TABLE 2

Shear Rate and Viscosity for 0.775 cm diameter capillary tube

| Slurry Type | Flow Rate (cm³/hr) | ΔP (kPa) | Shear Rate (s⁻¹) | Viscosity (mPa-s) | k (mPa-s) | n |
|---|---|---|---|---|---|---|
| 30 wt. % clay (no sand) | 500 | 1,800 | 4.31 | 2,695 | 7,075 | 0.37 |
| | 1,000 | 2,710 | 8.63 | 2,028 | 7,075 | 0.37 |
| | 1,982 | 3,010 | 17.1 | 1,136 | 7,075 | 0.37 |
| 35 wt. % clay (no sand) | 500 | 2,870 | 3.31 | 5,603 | 7,600 | 0.74 |
| | 1,000 | 4,720 | 6.62 | 4,607 | 7,600 | 0.74 |
| | 1,982 | 7,950 | 13.1 | 3,915 | 7,600 | 0.74 |
| 30 wt. % clay + 40 wt. % sand | 500 | 6,350 | 3.42 | 11,985 | 17,350 | 0.67 |
| | 1,000 | 8,900 | 6.84 | 8,400 | 17,350 | 0.67 |
| | 1,982 | 15,900 | 13.6 | 7,570 | 17,350 | 0.67 |
| 30 wt. % clay + 50 wt. % sand | 500 | 10,800 | 3.45 | 20,200 | 30,250 | 0.65 |
| | 1,000 | 15,400 | 6.90 | 14,400 | 30,250 | 0.65 |
| | 1,982 | 26,400 | 13.7 | 12,460 | 30,250 | 0.65 |
| 35 wt. % clay + 40 wt. % sand | 500 | 15,500 | 3.40 | 29,440 | 42,600 | 0.68 |
| | 1,000 | 23,100 | 6.80 | 21,940 | 42,600 | 0.68 |
| | 1,982 | 39,500 | 13.5 | 18,930 | 42,600 | 0.68 |
| 35 wt. % clay + 50 wt. % sand | 500 | 31,300 | 3.89 | 51,930 | 106,500 | 0.47 |
| | 1,000 | 43,400 | 7.78 | 36,000 | 106,500 | 0.47 |

The data in Table 1 shows that for a flow rate of 1000 cm³/hr, the viscosity increased by about 8 times when the reinforcing agent content increased from 0 wt. % sand to 40 wt. % sand, for both the 30 wt. % and 35 wt. % clay slurries.

For the 30 wt. % clay slurry, with the exception of the viscosity measured at 80 cm³/hr, the viscosity increased by about 3 times when the sand content was increased from 40 wt. % to 50 wt. %. For the 35 wt. % clay slurry, the viscosity increased by about 2 times when the sand content was increased from 40 wt. % to 50 wt. %.

When the clay content was increased from 30 wt. % to 35 wt. %, the viscosity increased by about 2 times, for both the 40 wt. % and 50 wt. % reinforcing agent samples.

The data in Table 2 shows that for a flow rate of 1000 cm³/hr, the viscosity increased by about 4 times when the reinforcing agent content increased from 0 wt. % sand to 40 wt. % sand, for both the 30 wt. % and 35 wt. % clay slurries.

For the 30 wt. % clay slurry, the viscosity increased by about 1.7 times when the sand content was increased from 40 wt. % to 50 wt. %. For the 35 wt. % clay slurry, the viscosity increased by about 2.3 times when the sand content was increased from 40 wt. % to 50 wt. %.

When the clay content was increased from 30 wt. % to 35 wt. %, the viscosity increased by about 2.6 times and 3.6 times, for the 40 wt. % and 50 wt. % reinforcing agent samples, respectively.

Estimated Injection Pressure

The pressure P required to inject a clay slurry into a formation is a function of the pressure drops $\Delta P_s$ across a surface injection pipe, $\Delta P_v$ down a vertical pipe and $\Delta P_f$ across pipe fittings and the bottom hole pressure $P_b$.

The $\Delta P_s$ across a surface injection pipe is estimated by equation (VI):

$$\Delta P_s/L = k(\gamma_{corr})^n (2/R) \tag{VI}$$

where:

k=power law constant n=power law index

R=injection pipe radius

L=injection pipe length $\gamma_{corr}$=corrected shear rate=$(3n+1)/(4n)\, \gamma_{app}$ where $\gamma_{app}$=apparent shear rate=$4Q/(\pi R^3)$ and Q=flow rate through pipe.

Using equation VI, the $\Delta P_s/L$ required to inject a 35 wt. % clay+40 wt. % sand slurry through a 2" (5.08 cm) pipe at a flow rate of 0.5 m³/min was estimated to be 60 kPa/m.

The $\Delta P_v$ down a vertical pipe was calculated from equation (VII), according to Shook et al ("Slurry Flow: Principles & Practice" Butterworths; pg. 112, 1991):

$$\Delta P_v/L = k(\gamma_{corr})^n (2/R) - \rho g \tag{VII}$$

where:

ρ=fluid density g=gravitational constant

Using a tubing diameter of 89 mm in a vertical well, the $\Delta P_v/L$ required to inject the same slurry down a vertical pipe was estimated to be 3.05 kPa/m.

The pressure drop across fittings ($\Delta P_f$) was estimated using equation (VIII):

$$\Delta P_f = K \rho U_m^2 \tag{VIII}$$

where:

K=resistance coefficient $U_m$=average superficial velocity=$Q/(\pi R^2)$

Q=volumetric flow rate

R=pipe radius

The resistance coefficient relationships were determined by Ma ("Stability, Rheology and Flow in Pipes, Bends, Fittings, Valves and Venturi Meters of Concentrated Non-Newtonian Suspensions" Ph.D. Thesis, University of Illinois, Chicago, 1987) for flow of laterite (an iron rich clay) and gypsum slurries and were therefore considered to be reasonable estimates for the 35 wt. % clay+40 wt. % sand slurry. In order to select the appropriate resistance coefficient relationship, the Reynolds number (Re) was first calculated to determine whether flow was laminar or turbulent, using equation (IX):

$$Re = U_m D/(\eta/\rho) \tag{IX}$$

The Reynolds number for injection of a 35 wt. % clay+40 wt. % sand slurry through a 2' (5.08 cm) diameter pipe (D) at a flow rate of 0.5 m³/min was calculated to be 411, where $\eta = k\,(\gamma_{corr})^n$, n=0.36 (Table 1), $\gamma_{corr}$=936 s⁻¹ and ρ=1,640 kg/M³. Accordingly, because the Reynolds number was less than 2000, flow was determined to be laminar.

For a laminar flow regime, the resistance coefficient for 2" (5.08 cm) fittings can be estimated from equation (X) for a 90° elbow:

$$K=36.81(Re)^{-0.441} \quad (X)$$

The resistance coefficient for a globe valve is 6.65.

Using the resistance coefficient relationships, the $\Delta P_f$ for a globe valve was calculated as 184 kPa and the $\Delta P_f$ for a 90° elbow was calculated to be 72 kPa. For an installation with 1 globe valve and three 90° elbows, the total pressure drop across the fittings was calculated to be $\Delta P_f$=400 kPa.

The bottom hole pressure is typically in the range of from about 1000 to 4000 kPa for cold production wells in Alberta. For this discussion, we will assume a bottom hole pressure $P_b$ of 2000 kPa.

Accordingly, the pressure P required to inject a 35 wt. % clay+40 wt. % sand slurry at a flow rate of 0.5 m³/min through 30 m of surface injection pipe, three 90° elbows, one globe valve, 500 m of vertical pipe into a formation with a bottom hole pressure of 2000 kPa is:

P=$\Delta P_s$/L (30 m)+$\Delta P_v$/L (500 m)+$\Delta P_{f+Pb}$

P=60 kPa/m(30 m)+3.05 kPa/m(500 m)+400 kPa+2000 kPa

P=5725 kPa

This estimated injection pressure of 5725 kPa is a reasonable injection pressure for field applications. Accordingly, the reinforced clay slurry can be injected into a formation. This is a surprising result because even a 20 wt. % clay/water composition, without an inhibitive cation, would form a non-pumpable clay gel, instead of a clay slurry. The inhibitive cation, however, surprisingly maintains a pumpable clay slurry consistency at 35 wt. % clay. Moreover, a commercially reasonable injection pressure (e.g., 5725 kPa) for injecting the clay slurry composition can still be maintained even with 40 wt. % sand added to that composition.

EXAMPLE 4

This example shows that the strength of clay gel, i.e., its ability to prevent fluid breakthrough in otherwise high permeability regions, such as wormholes, is significantly increased by the addition of a reinforcing agent. The clay gel strength was calculated from the maximum pressure that the gel could resist without yielding. The strength of a reinforcing clay gel was 3 to 6 times greater than a similar clay gel without a reinforcing agent.

Wormhole Blocking Simulation

The diameter of wormholes in a subterranean formation can vary from approximately 10 cm near the wellbore to 5 cm up to a hundred meters away. In order to simulate the efficacy in blocking of a wellbore, the reinforced clay gels were tested in a concentric cell flow system. A cylindrical cell (16.51 cm long, 7.62 inside diameter) has a central channel (2.67 cm diameter, 13 cm long), defined by a 32 mesh stainless steel cylindrical support screen covered with a 200 mesh screen, and an annulus surrounding the channel. The annulus was filled with 70/140 mesh Ottawa sand. The mesh sizes are US Standard Sieve sizes.

The cell was closed and mounted in the flow system. The cell was purged with carbon dioxide, evacuated and the sand was saturated with a sodium chloride exchange solution, to simulate brine in a subterranean formation. The pressure drop across the central channel was measured with a differential pressure transducer attached on endcaps of the cylindrical cell.

A reinforced clay slurry produced in Example 2 was injected into the central channel at 1124 cm³/hour. Slurry was injected into the channel over a 15 to 20 minute period during which the pressure drop reached steady state. The injected volume of slurry was several times greater than the channel volume.

The cell was then shut in for a minimum of four days to allow ion exchange between the reinforced clay slurry and the NaCl brine in the annular pore space. The ion exchange between the potassium ions of the reinforced clay slurry and the NaCl brine caused the clay to hydrate and swell, forming a reinforced clay gel. The strength of the reinforced clay gel was determined by a displacement fluid applied to the inlet of the central channel at a constant pressure. The displacement fluid used was either 1.75 wt. % NaCl brine or a 30 wt. % clay slurry. The inlet pressure was increased periodically until the gel inside the central channel yielded to the fluid pressure. Effluent was collected to determine how and when the gel yielded.

Five tests were conducted with different slurry compositions, exchange brine compositions and displacement fluids. The experimental conditions are summarized in Table 3. The results of the tests are presented in Table 4 and FIGS. 2 to 5. The Control sample was a clay slurry produced in Example 1, without the reinforcing agent added in Example 2.

TABLE 3

| Test # | Clay content in clay slurry (wt. %) | Clay content in reinforced clay slurry (wt. %) | Sand content in reinforced clay slurry (wt. %) | Exchange solution in Flow System (wt. % NaCl) | Displacement Fluid |
|---|---|---|---|---|---|
| Control | 35 | N/A | 0 | 1.75 | 1.75 wt. % NaCl brine |
| 1 | 35 | 21 | 40 (cleaned sand) | 1.75 | Brine initially, then 30 wt. % clay slurry |
| 2 | 30 | 15 | 50 (cleaned sand) | 1.75 | 30 wt. % clay slurry |
| 3 | 30 | 15 | 50 (natural sand) | 1.75 | 30 wt. % clay slurry |
| 4 | 35 | 17.5 | 50 (cleaned sand) | 1.75 | 30 wt. % clay slurry |

Figure 1:
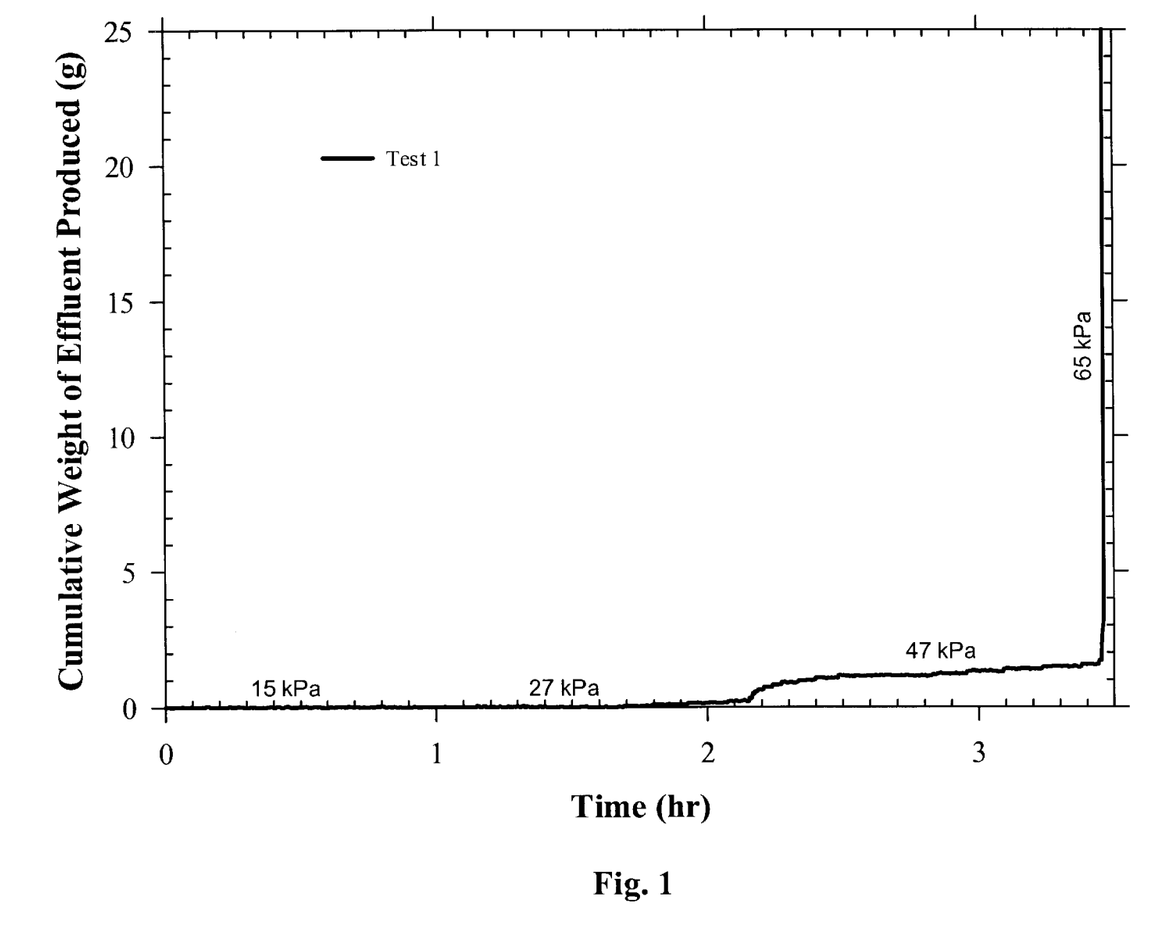
FIG. 1 is a graphical representation of the cumulative weight of effluent produced over time with an applied pressure for Test #1 of Example 4.
Figure 2:
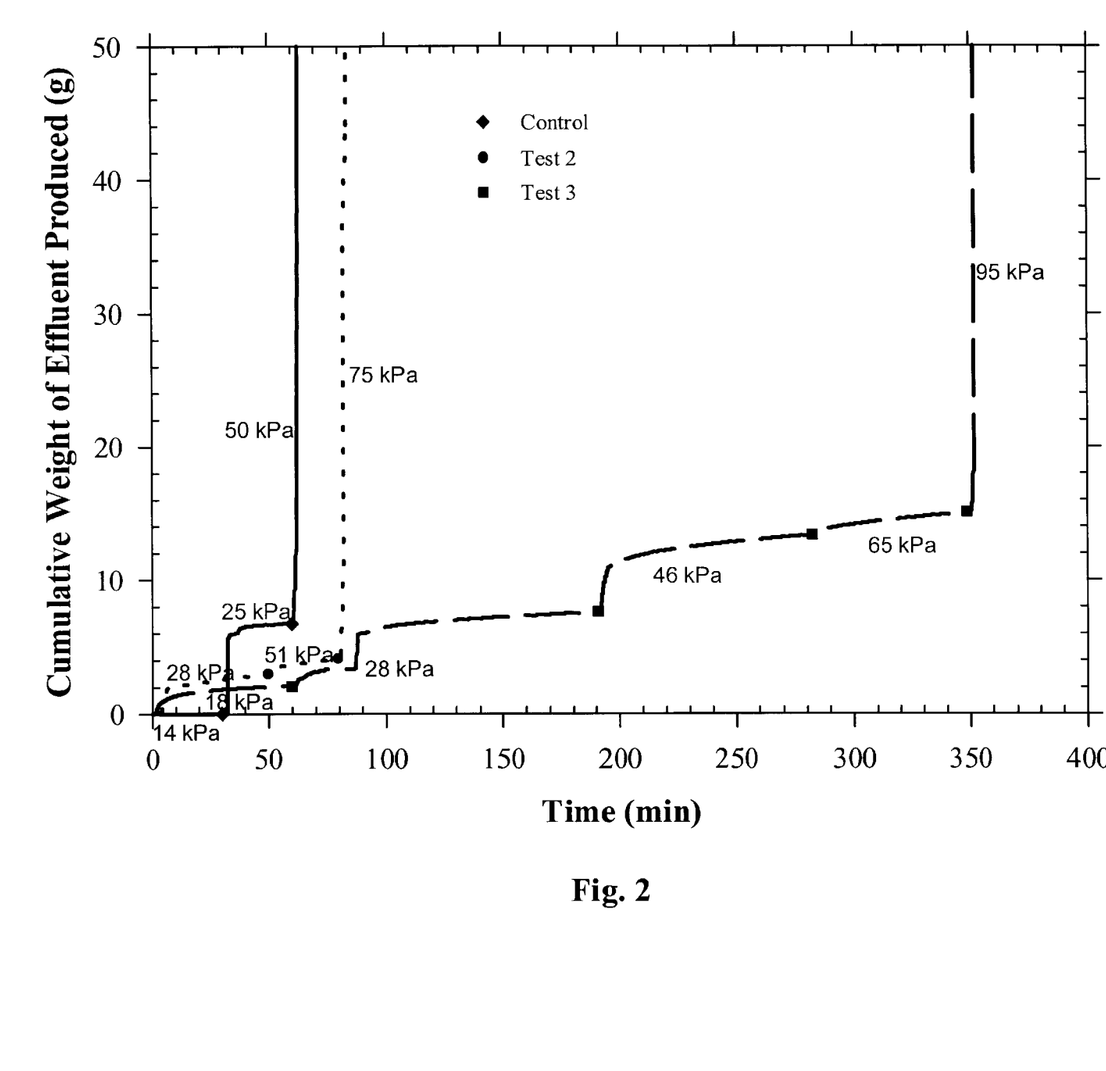
FIG. 2 is a graphical representation of the cumulative weight of effluent produced over time with an applied pressure for the Control sample and Tests #2 and 3 of Example 4.
Figure 3:
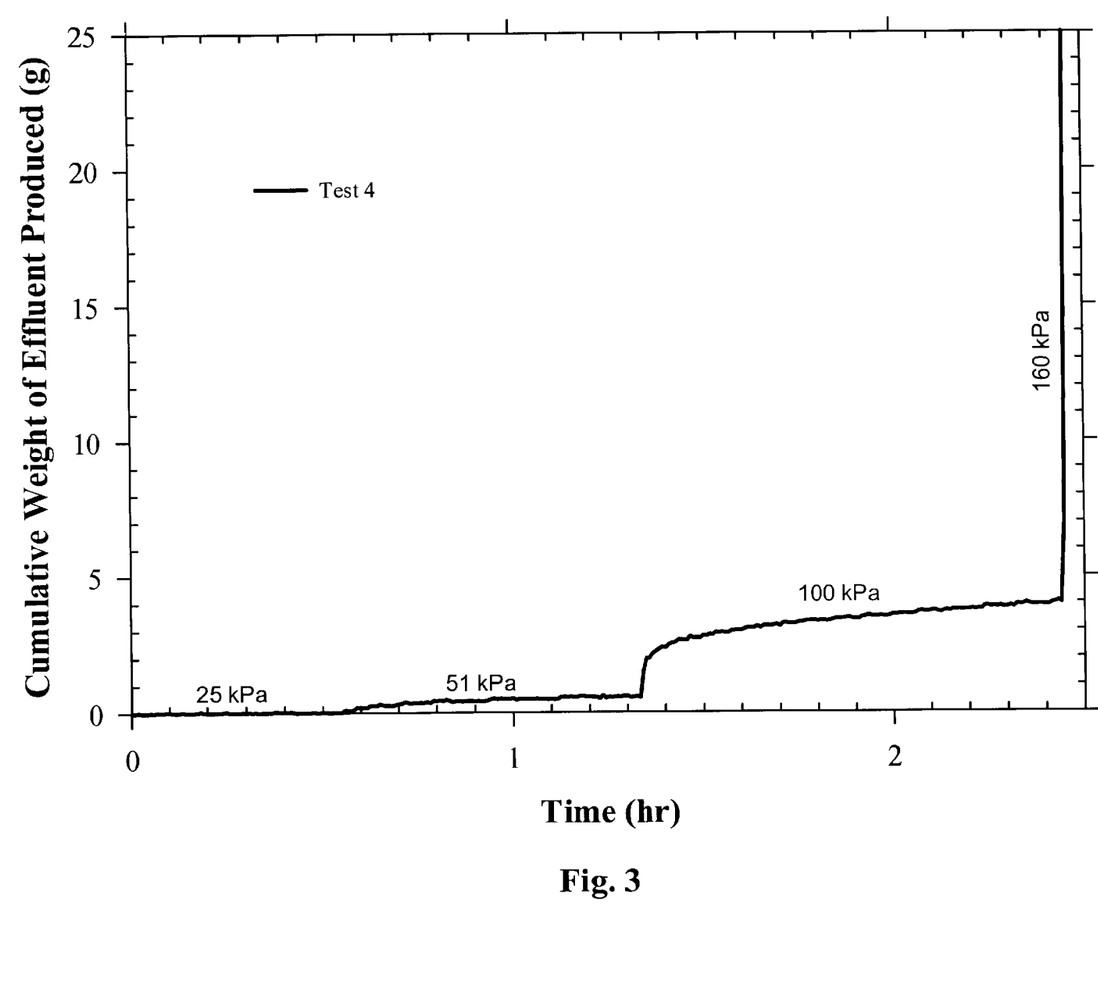
FIG. 3 is a graphical representation of the cumulative weight of effluent produced over time with an applied pressure for Test #4 of Example 4.

The injection pressure was increased in fairly large increments during the test until the gel yielded completely inside the channel. Complete yielding of the slurry was demonstrated by a sharp increase in the effluent produced, as illustrated in FIGS. 1 to 3. The injection pressure at yield of the gel inside the central channel is presented in Table 4. It will be understood that the actual yield pressure may fall within the range of the highest pressure without yield and the pressure at which yield was detected because the pressure was incrementally changed. Accordingly, the yield pressure in Table 4 is presented as a pressure range.

A yield stress range was calculated from the yield pressure range using the equation (XI):

$$\tau=F/A=\pi R^2 P/(2\pi RL)=RP/(2L) \quad (XI)$$

where t is shear stress, F is the force applied to the gel, A is the contact area, R is the radius of the central channel, P is the pressure applied to the gel and L is the length of the channel. The yield stress range is also presented in Table 4.

TABLE 4

| Test # | Yield Pressure (kPa) | Yield Stress (kPa) |
|---|---|---|
| Control | 14–25 | 0.6–1.2 |
| 1 | 47–65 | 2.4–3.3 |
| 2 | 51–75 | 2.6–3.8 |
| 3 | 65–95 | 3.3–4.9 |
| 4 | 100–160 | 5.1–8.2 |

Control

The Control test was conducted with a 35 wt. % clay slurry. After 3 days of shut in for ion exchange with 1.75 wt. % NaCl brine, the endcaps and the flowlines to and from the central channel were filled with 1.75 wt. % NaCl brine. Brine flow through the channel was blocked by the 35 wt. % clay gel at 14 kPa (2.0 psi) but the clay gel yielded at 25 kPa (3.6 psi), as shown in FIG. 2.

Test #1

Test #1 was conducted with a 35 wt. % clay slurry. The clay slurry was mixed with 40 wt. % "cleaned" sand.

After four days of shut in for ion exchange with 1.75 wt. % NaCl brine, the endcaps and the flowlines to and from the central channel were filled with 1.75 wt. % NaCl brine. The inlet of the central channel was subjected to a loading of about 15 kPa (2.2 psi) pressure for 1 hour. The pressure was increased to 27 kPa (3.9 psi) for 1 hour and then to 47 kPa (6.8 psi), representing a pressure gradient of 360 kPa/m, for 1 hour. The reinforced clay gel yielded at 65 kPa (9.4 psi), as shown in FIG. 1.

Test #2

Test #2 was conducted with a 30 wt. % clay slurry, which was mixed with 50 wt. % "cleaned" sand.

After four days of shut in for ion exchange with 1.75 wt. % NaCl brine, the endcaps and the flowlines to and from the central channel were filled with 1.75 wt. % NaCl brine.

When the brine was loaded at the inlet end of the central channel at a pressure of 34 kPa (4.9 psi), brine was produced slowly from the outlet end of the channel. It was determined that brine had channeled through the sand in the cell annulus. At this point, brine was removed from the central channel inlet and was replaced with 30 wt. % clay slurry. Clay slurry was applied to the inlet of the central channel at a pressure of 28 kPa (4.1 psi) for 0.8 hours. The clay slurry did not pass through the 200 mesh screen into the cell annulus. As a thin filter cake was built around the screen, bypass flow through the annulus was blocked. Loading of the clay slurry to the inlet of the central channel was increased to 51 kPa (7.4 psi), representing a pressure gradient of 390 kPa/m, for 0.5 hour without further yielding. The gel yielded when loading was increased to 75 kPa (10.9 psi), as shown in FIG. 2.

Test #3

Test #3 was conducted in the same manner as Test #2, using 50 wt. % "natural" sand to produce the reinforced clay slurry.

After seven days of shut in for ion exchange with 1.75 wt. % NaCl brine, the endcaps and the flowlines to and from the central channel were filled with 30 wt. % clay slurry. Clay slurry was applied to the inlet of the central channel at a pressure of 18 kPa (2.6 psi) for 1 hour. Loading of the clay slurry to the inlet of the central channel was increased to 28 kPa (4.1 psi) for 2.2 hours, 46 kPa (6.7 psi) for 1.5 hours, and 6.5 kPa (0.9 psi), representing a pressure gradient of 500 kPa/m, for 1.1 hours without further yielding. The gel yielded when loading was increased to 95 kPa (13.8 psi), as shown in FIG. 2.

Test #4

The clay slurry concentration was increased to 35 wt. % clay. The clay mixed with 50 wt. % "cleaned" sand.

After six days of shut in for ion exchange with 1.75 wt. % NaCl brine, the endcaps and the flowlines to and from the central channel were filled with 30 wt. % clay slurry. Clay slurry was applied to the inlet of the central channel at a pressure of 25 kPa (3.6 psi) for 0.5 hour. Loading of the clay slurry to the inlet of the central channel was increased incrementally to 51 kPa (7.4 psi) for about 0.8 hour, and 100 kPa (14.5 psi), representing a pressure gradient of 770 kPa/m, for 1.1 hours without further yielding. The gel yielded when loading was increased to 160 kPa (23.2 psi), as shown in FIG. 3.

Results

The yield stress of the reinforced clay gels of Test #1 (40% sand) and Test #4 (50% sand) was about 3 and about 7 times greater, respectively, than the yield stress for the Control clay gel. These results indicate that a reinforcing agent increases the yield stress of a clay gel and that the yield stress increases with increasing content of reinforcing agent.

Tests #2 and #3 were conducted to determine the influence of the reinforcing agent purity on clay gel yield stress. The yield stress was slightly greater for the reinforced clay gel of Test #3, using the "natural" sand. This indicates that "natural" produced sands could be used as a reinforcing agent in clay gel, without adversely affecting the strength of the clay gel. This provides a useful solution for disposal of produced sands.

The same reinforcing agent content was used in Tests #2 and #4. However, the clay content was lower in Test #2. The results demonstrate that the yield stress is higher at higher clay contents.

Preferred embodiments of the present invention have been described. It will be understood that the foregoing is provided for illustrative purposes only and that other embodiments and applications can be employed without departing from the true scope of the invention described in the following claims.

We claim:

1. A method for controlling the flow of at least one fluid in a subterranean formation having at least a first region, said first region having (i) at least $Na^+$, and (ii) a first permeability, $K_1$, with respect to said fluid, said method comprising:
    (a) making an inhibitive electrolyte solution having water and at least one inhibitive compound, said inhibitive compound having at least one cation and anion;
    (b) making a clay/reinforcing agent slurry by mixing at least about 15 weight percent of a swelling clay with said inhibitive electrolyte solution so that, to the extent clay gel is produced, if any, the flowability of said slurry is not substantially inhibited and mixing a reinforcing agent in the range of from about 10 weight percent to about 60 weight percent;
    (c) injecting said clay/reinforcing agent slurry into said formation, so that at least a portion of said slurry contacts said first region;
    (d) allowing a reinforced clay gel to form in said first region so that $K_1$ is reduced to produce a lower permeability, $K_{1L}$, with respect to said fluid; and
    (e) controlling the flow of at least a majority of said at least one fluid into or from said first region.

2. The method of claim 1 wherein said method is used in the production of hydrocarbons from said formation.

3. The method of claim 1 wherein said method is used to substantially contain said at least one fluid from said first region into a second region, said second region having at least a portion contiguous with said first region.

4. The method of claim 1 wherein the amount of clay in said clay/reinforcing agent slurry is in the range from about 15 weight percent to about 35 weight percent.

5. The method of claim 1 wherein the amount of clay in said clay/reinforcing agent slurry is in the range from about 25 weight percent to about 35 weight percent.

6. The method of claim 1 wherein the concentration of the inhibitive compound in said inhibitive electrolyte solution is in the range from about from about 0.5 weight percent to about 5 weight percent, based on the total weight of the clay/reinforcing agent slurry.

7. The method of claim 1 wherein said cation is selected from the group consisting of $Al^{3+}$, $Cs^+$, $Ca^{2+}$, $Fe^{2+}$, $k^+$, $Mg^{2+}$, $NR_4^+$, where each R can independently be H, $CH_3$, $C_6H_5$, or $CH_2\ CH_3$ and combinations thereof.

8. The method of claim 1 wherein the concentration of said reinforcing agent in said clay/reinforcing agent slurry is in the range of from about 30 weight percent to about 50 weight percent.

9. The method of claim 1 wherein the concentration of said reinforcing agent in said clay/reinforcing agent slurry is in the range of from about 40 weight percent to about 50 weight percent.

10. The method of claim 1 wherein said reinforcing agent is selected from the group consisting of particles of produced sand, silica sand, sandy or silty soil, crushed rock, minerals, mine tailings, and combinations thereof.

11. The method of claim 1 wherein said reinforcing agent is selected from the group consisting of particles having an average largest dimension in the range of from about 20 $\mu$m to about 3 mm.

12. The method of claim 1 wherein said formation further comprises a second region having a second permeability, $K_2$, with respect to said fluid that is less than $K_1$, said first and second regions being contiguous to each other, wherein, (a) when said clay gel is formed in step (d), said $K_{1L}$ is less than $K_2$ and, (b) the flow of at least a majority of said at least one fluid is controlled into or from said first region.

13. A method for controlling the flow of at least one fluid in a subterranean formation having at least a first region, said first region having (i) at least $Na^+$, and (ii) a first permeability, $K_1$, with respect to said fluid said method comprising:

(a) making a first inhibitive electrolyte solution having water and at least one inhibitive compound, said inhibitive compound having at least one cation and anion;

(b) treating a swelling clay with said first inhibitive electrolyte solution;

(c) making a clay/reinforcing agent slurry having at least about 15 weight percent of the treated clay of step (b) and a second inhibitive electrolyte solution having water and at least one inhibitive compound and mixing a reinforcing agent in the range from about 10 weight percent to about 60 weight percent;

(d) injecting said clay/reinforcing agent slurry into said formation, so that at least a portion of said slurry contacts said first region;

(e) allowing a reinforced clay gel to form in said first region so that $K_1$ is reduced to produce a lower permeability, $K_{1L}$, with respect to said fluid; and (f) controlling the flow of at least a majority of said at least one fluid into or from at least said first region.

14. The method of claim 13 wherein the treated clay of step (b) has a reduced ability to form a clay gel, if any, when said treated clay is mixed with distilled water.

15. The method of claim 13 wherein the treated clay of step (b) is treated by washing said clay at least once with said first inhibitive electrolyte solution and drying said washed clay.

16. The method of claim 15 further comprising washing said clay with at least water at least once after said clay is washed at least once with said first inhibitive electrolyte solution but before said clay is dried.

17. The method of claim 15 wherein the concentration of the inhibitive compound in said first inhibitive electrolyte solution is in the range from about 1 weight percent to about 20 weight percent.

18. The method of claim 13 wherein the concentration of the inhibitive compound in said second inhibitive electrolyte solution is in the range from about 0.5 weight percent to about 5 weight percent, based on the total weight of the clay/reinforcing agent slurry.

19. The method of claim 13 wherein the control of said fluid is used in the production of hydrocarbons from said formation.

20. The method of claim 13 wherein the control of said fluid is used to inhibit a rate of flow of at least said fluid from said first region into a second region, said second region having at least a portion contiguous with said first region.

21. The method of claim 13 wherein the amount of clay in said clay/reinforcing agent slurry is in the range from about 15 weight percent to about 35 weight percent.

22. The method of claim 13 wherein the amount of clay in said clay/reinforcing agent slurry is in the range from about 25 weight percent to about 35 weight percent.

23. The method of claim 13 wherein said cation is selected from the group consisting of $Al^{3+}$, $Cs^+$, $Ca^{2+}$, $Fe^{2+}$, $k^+$, $Mg^{2+}$, $NR_4^+$, where each R can independently be H, $CH_3$, $C_6H_5$, or $CH_2CH_3$ and combinations thereof.

24. The method of claim 13 wherein the concentration of said reinforcing agent in said clay/reinforcing agent slurry is in the range of from about 30 weight percent to about 50 weight percent.

25. The method of claim 13 wherein the concentration of said reinforcing agent in said clay/reinforcing agent slurry is in the range of from about 40 weight percent to about 50 weight percent.

26. The method of claim 13 wherein said reinforcing agent is selected from the group consisting of particles of produced sand, silica sand, sandy or silty soil, crushed rock, minerals, mine tailings, and combinations thereof.

27. The method of claim 13 wherein said reinforcing agent is selected from the group consisting of particles having an average largest dimension in the range of from about 20 $\mu$m to about 3mm.

28. The method of claim 13 wherein said formation further comprises a second region having a second permeability, $K_2$, with respect to said fluid that is less than $K_1$, said first and second regions being contiguous to each other, wherein (a) when said clay gel is formed in step (e), said $K_{1L}$ is less than $K_2$ and, (b) the flow of at least a majority of the said at least one fluid is controlled into or from at least said first region.

* * * * *